(12) United States Patent
Dykes

(10) Patent No.: US 11,640,752 B2
(45) Date of Patent: May 2, 2023

(54) RELATIVE DIRECTIONAL INDICATOR

(71) Applicant: Jeffrey L. Dykes, Eau Claire, WI (US)

(72) Inventor: Jeffrey L. Dykes, Eau Claire, WI (US)

(*) Notice: Subject to any disclaimer, the term of this patent is extended or adjusted under 35 U.S.C. 154(b) by 0 days.

(21) Appl. No.: 16/967,127

(22) PCT Filed: Jan. 14, 2019

(86) PCT No.: PCT/US2019/013550
§ 371 (c)(1),
(2) Date: Aug. 3, 2020

(87) PCT Pub. No.: WO2019/140411
PCT Pub. Date: Jul. 18, 2019

(65) Prior Publication Data
US 2021/0104136 A1 Apr. 8, 2021

Related U.S. Application Data

(60) Provisional application No. 62/616,586, filed on Jan. 12, 2018.

(51) Int. Cl.
*G01C 17/02* (2006.01)
*G08B 5/36* (2006.01)

(52) U.S. Cl.
CPC ............. *G08B 5/36* (2013.01); *G01C 17/02* (2013.01)

(58) Field of Classification Search
CPC . G08B 5/36; G08B 25/10; G08B 3/00; G08B 21/02; G01C 17/02
See application file for complete search history.

(56) References Cited

U.S. PATENT DOCUMENTS

| | | | | |
|---|---|---|---|---|
| 5,146,231 A | * | 9/1992 | Ghaem | G01C 21/20 342/439 |
| 7,266,452 B2 | * | 9/2007 | Ockerse | G01C 17/38 702/92 |
| 8,542,114 B2 | * | 9/2013 | Stolarczyk | G08B 21/0291 340/539.13 |
| 9,303,991 B2 | * | 4/2016 | Garrone | G01C 17/28 |
| 9,746,325 B2 | * | 8/2017 | Garrone | G01C 17/28 |
| 9,848,666 B1 | * | 12/2017 | Egeland | A42B 3/0466 |
| 10,012,506 B1 | * | 7/2018 | Monahan | G01C 21/20 |
| 10,058,721 B2 | * | 8/2018 | Dykes | G08B 5/36 |
| 10,420,965 B1 | * | 9/2019 | Dykes | A42B 3/0433 |

(Continued)

FOREIGN PATENT DOCUMENTS

| CN | 109726837 A | * | 5/2019 | G06Q 30/04 |
|---|---|---|---|---|
| WO | WO-2019140411 A1 | * | 7/2019 | G01C 17/02 |

*Primary Examiner* — Yaritza Guadalupe-McCall
(74) *Attorney, Agent, or Firm* — Underwood & Associates, LLC

(57) ABSTRACT

An electronic relative directional indicator includes a microcontroller in electronic communication with an electronic compass, an electronic motion-detecting module and at least one light source that is controllably illuminable. A battery life of the electronic relative directional indicator is managed by monitoring the electronic motion-detecting module for motion within pre-defined time periods and reducing power to electronic components accordingly. The electronic relative directional indicator can be placed on the face shield portion of a self-contained breathing apparatus face mask to provide a constant source of orientation for firefighters in reduced- or zero-visibility environments.

20 Claims, 11 Drawing Sheets

(56) References Cited

U.S. PATENT DOCUMENTS

| | | | |
|---|---|---|---|
| 10,638,401 B2* | 4/2020 | Daoura | G08B 25/10 |
| 11,112,964 B2* | 9/2021 | Davydov | G06F 3/0484 |
| 2003/0218546 A1* | 11/2003 | Lemp, III | G09B 27/00 |
| | | | 340/815.4 |
| 2004/0254727 A1* | 12/2004 | Ockerse | G01C 17/38 |
| | | | 701/535 |
| 2005/0003873 A1* | 1/2005 | Naidu | H01Q 1/125 |
| | | | 455/562.1 |
| 2005/0046581 A1* | 3/2005 | Lemp, III | G09B 27/04 |
| | | | 434/106 |
| 2006/0244621 A1* | 11/2006 | Lemp, III | G01C 21/02 |
| | | | 340/815.4 |
| 2007/0288166 A1* | 12/2007 | Ockerse | G01C 17/30 |
| | | | 701/530 |
| 2009/0254294 A1* | 10/2009 | Dutta | G01C 25/005 |
| | | | 702/92 |
| 2013/0024117 A1* | 1/2013 | Pavetti | G01C 21/16 |
| | | | 701/538 |
| 2016/0195393 A1* | 7/2016 | Garrone | G01C 17/38 |
| | | | 33/361 |
| 2016/0238850 A1* | 8/2016 | Yang | G02B 27/0176 |
| 2017/0199034 A1* | 7/2017 | Waters | G06K 7/10792 |
| 2018/0060766 A1* | 3/2018 | Dimino, Jr. | G06Q 50/26 |
| 2018/0199138 A1* | 7/2018 | Dusan | H04W 64/006 |
| 2018/0206177 A1* | 7/2018 | Daoura | H04W 4/12 |
| 2019/0220786 A1* | 7/2019 | Dimino, Jr. | H04W 4/80 |
| 2020/0020211 A1* | 1/2020 | Gabbay | G08B 6/00 |
| 2020/0049503 A1* | 2/2020 | Ohyama | G01C 17/02 |
| 2021/0104136 A1* | 4/2021 | Dykes | G08B 21/02 |

\* cited by examiner

RELATIVE DIRECTIONAL INDICATOR

TECHNICAL FIELD

This disclosure relates to systems and methods for determining and displaying relative directional information. In particular, this disclosure relates to a relative directional indicator that correlates one or more relative headings to a measured compass bearing and visually displays the one or more relative headings to a user.

BACKGROUND

Emergency service providers such as fire and police departments commonly use a naming protocol to designate exterior sides of a building. The protocol usually includes assigning the side of the structure parallel with, or nearest to the street on which the building is located the "A" side of the building. For an exemplary rectangular or square building, the remaining sides are successively named the "B," "C" and "D" sides, clockwise from the "A" side.

Such a convention is intended to reduce confusion during communications between, for example, firefighters and command staff, and to provide a simple construct for situational awareness in an incident command system. For example, a firefighter may enter the front door of a building charged with smoke, thereby reducing or eliminating visibility. Following the naming protocol, the firefighter knows he is entering the "A" side of the building, regardless of the true or compass heading or orientation of the building. Turning left, the firefighter knows even in zero-visibility conditions that if he encounters a wall he is likely on the "B" side; following that wall he will ultimately reach the "C" side, and so on. This convention makes it simpler when the firefighter communicates his whereabouts to command staff when it becomes necessary to provide updates, progress reports, etc., or if the firefighter needs to request help.

Emergency personnel can become disoriented in high-stress and/or low- or no-visibility environments, which can make determining compass headings difficult. Following the construct above, it can be simpler and possibly more accurate for a firefighter to report that he has found a victim on the "B" side of the building as compared to the "northeast side," for example. In general, compass orientation can become especially problematic for non-rectangular buildings and buildings whose walls are non-parallel to compass principal ordinate axes N, S, E and W.

However, even experienced firefighters and rescue personnel can become completely disoriented within a low- or no-visibility environment, especially when coupled with the high stress and anxiety that can come with firefighting and rescue operations. Thus, an electronic device that displays a user's heading or "facing direction" that correlates compass headings to a convention or protocol designator such as "A-Side" "B-Side," "C-Side," etc., is an unmet need.

SUMMARY

In one exemplary aspect, a portable, electronic relative directional indicator device is disclosed. The portable electronic relative directional indicator device includes a main body, itself including front and rear sides, wherein the front side includes at least one relative direction indicator. The portable electronic relative directional indicator device further includes a power source; at least one light source configured to controllably illuminate the relative directional indicator or, alternatively, the directional indicator can be an electronic display; an electronic compass module configured to determine a compass directionality of the portable relative directional indicator device; alternatively, an electronic motion-detecting module configured for detecting motion of the portable relative directional indicator device; and a microcontroller in electronic communication with the electronic compass module and the motion-detecting module, if present. The microcontroller is configured to assign a heading of the electronic relative directional indicator to a chosen structural feature used as a point of orientation in locating or visualizing other structures, such as the "A" side of a building having, for example, connecting "B," "C" and "D" sides; the bow of a ship having, for example, starboard and port sides and a stern, and so on. The microcontroller is further configured to control an operational aspect of the at least one light source or the electronic compass based on one or more signals received from the electronic motion-detecting module, if present.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The foregoing summary is illustrative only and is not intended to be in any way limiting. In addition to the illustrative aspects, embodiments, and features described above, further aspects, embodiments, and features will become apparent by reference to the drawings and the following detailed description and claims.

BRIEF DESCRIPTION OF DRAWINGS

The present embodiments are illustrated by way of the figures of the accompanying drawings, which may not necessarily be to scale, in which like references indicate similar elements, and in which:

FIG. 2B illustrates a non-character relative directional indicator according to one embodiment;

DETAILED DESCRIPTION OF ILLUSTRATIVE EMBODIMENTS

In general, a relative directional indicator (hereinafter RDI) is disclosed. Without limitation, in a preferred embodiment the RDI is configured for use with a protective face mask, a shield or other similar object and can be mounted thereon in any desired configuration or orientation. For example, a RDI can be mounted on the inside or outside of a self-contained breathing apparatus (SCBA) face shield in any desired location, but preferably one which least impedes the user's visibility through the face shield portion of the shield. It should be understood that an RDI can be placed elsewhere on a person or equipment as preferred.

In general, RDI's of the type described herein are configured to provide the user an indication of a direction, heading or bearing (herein referred to as a relative heading), relative to an anatomical structure, feature or object that is itself correlated by the user to a compass heading. A relative heading can be one that is assigned by the user to the orientation of a chosen physical object, such as, and without limitation facing a particular wall of a building; a side of a house or building; the bow, stern, port or starboard side of a ship; or any other object or object feature that is correlatable to a compass direction. In a preferred embodiment, a RDI can include a display portion, which itself may include one or more indicia or displays for displaying relative heading information to a user. Such information can provide the wearer a constant source of relative orientation information according to a chosen naming construct even in zero-visibility conditions.

Figure 1:
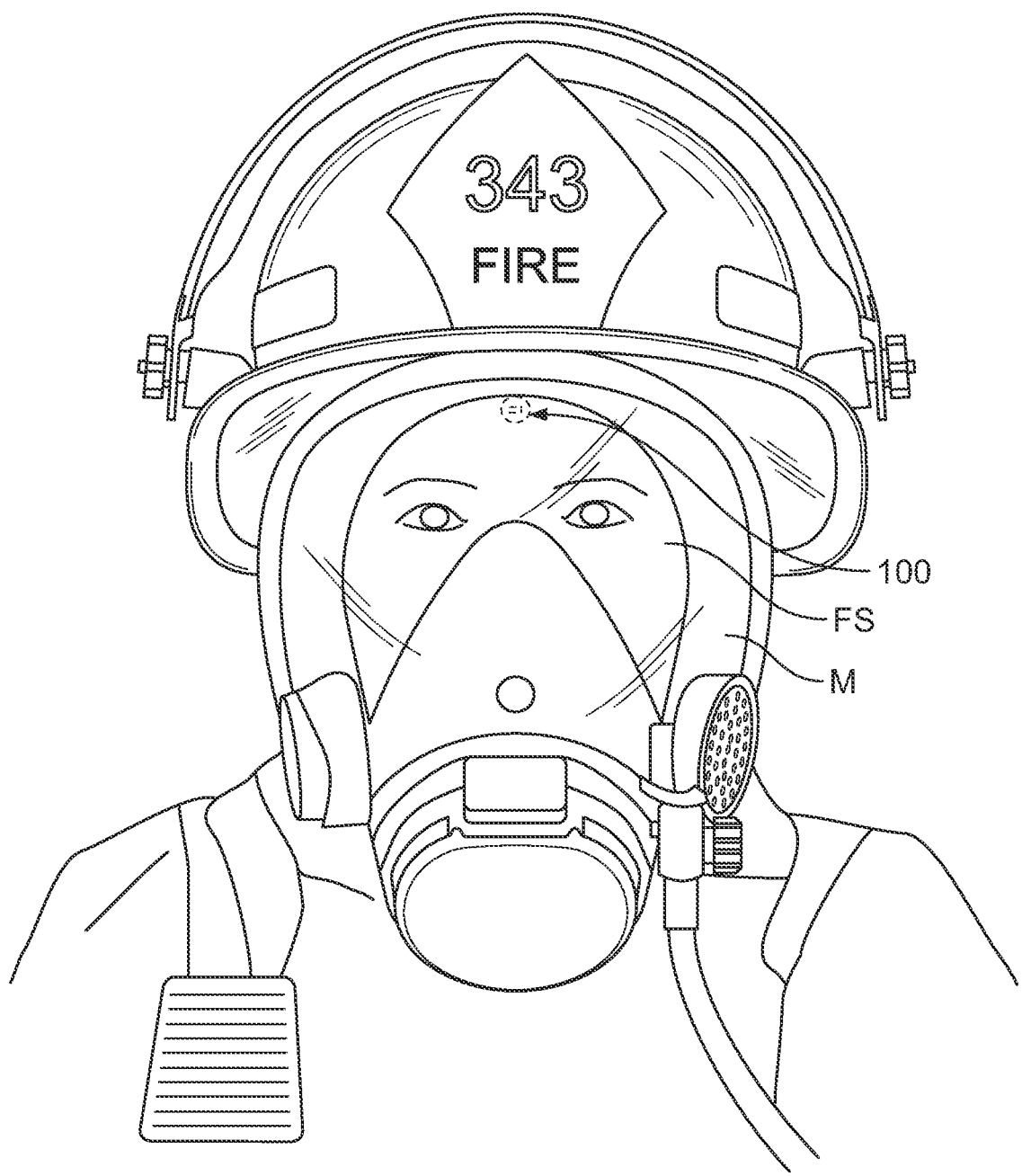
FIG. 1 illustrates a relative directional indicator disposed on an inside portion of a SCBA face shield, according to one embodiment.

Referring now to FIG. 1, a RDI 100 is shown attached to a face shield (FS) portion of a SCBA face mask (M). FIG. 1 shows the RDI 100 illustrated as a dashed circle to indicate that it is mounted on the inside of the face mask, although its placement is not so limited in this or other embodiments. In this example, the RDI 100 is placed substantially between and above the user's eyes to minimize obstruction of view through the face shield. The RDI 100 can be attached to the face shield using, e.g., an adhesive, which can provide for reversible attachment or, in other approaches, using fasteners or other, more permanent mounting methods.

Figure 2:
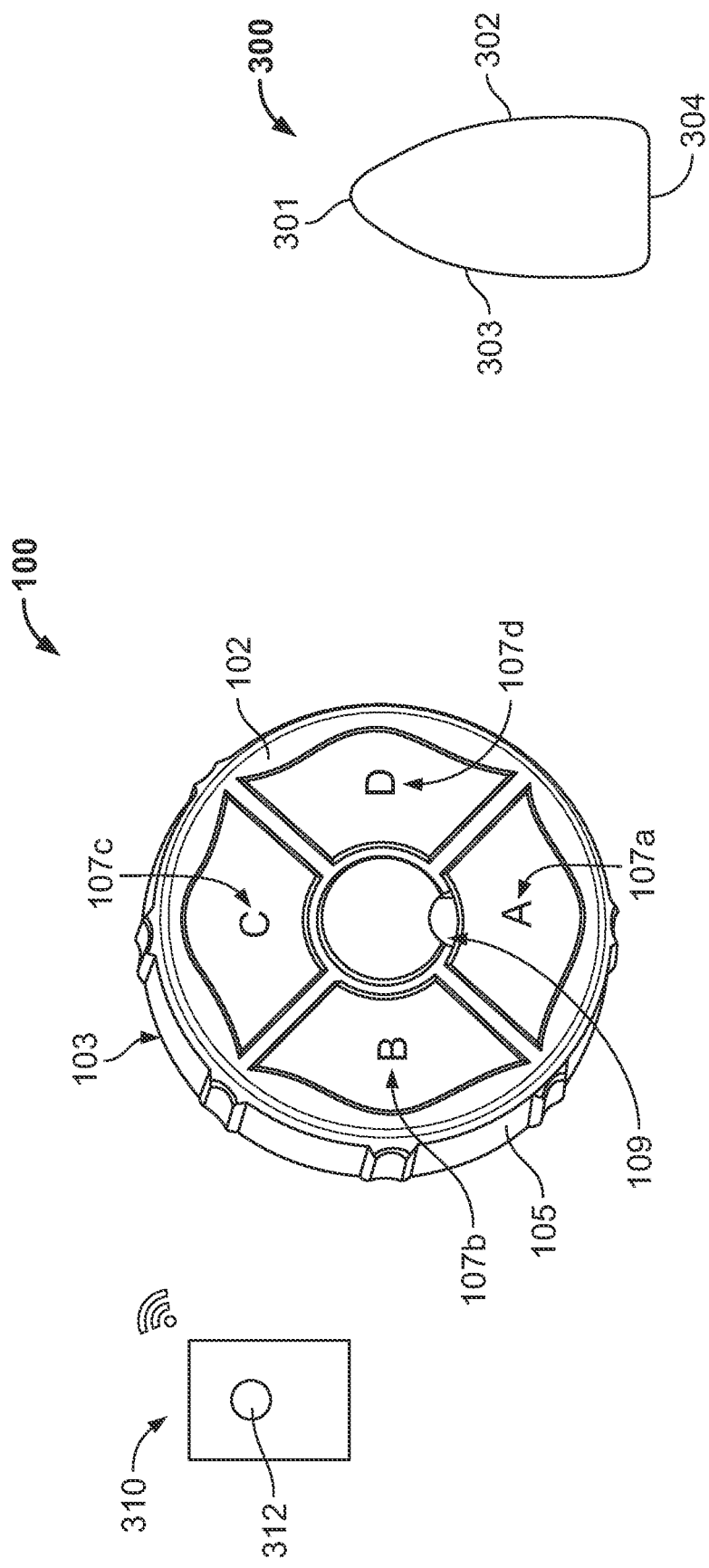
FIG. 2 is a relative directional indicator according to one embodiment.
Figure 3:
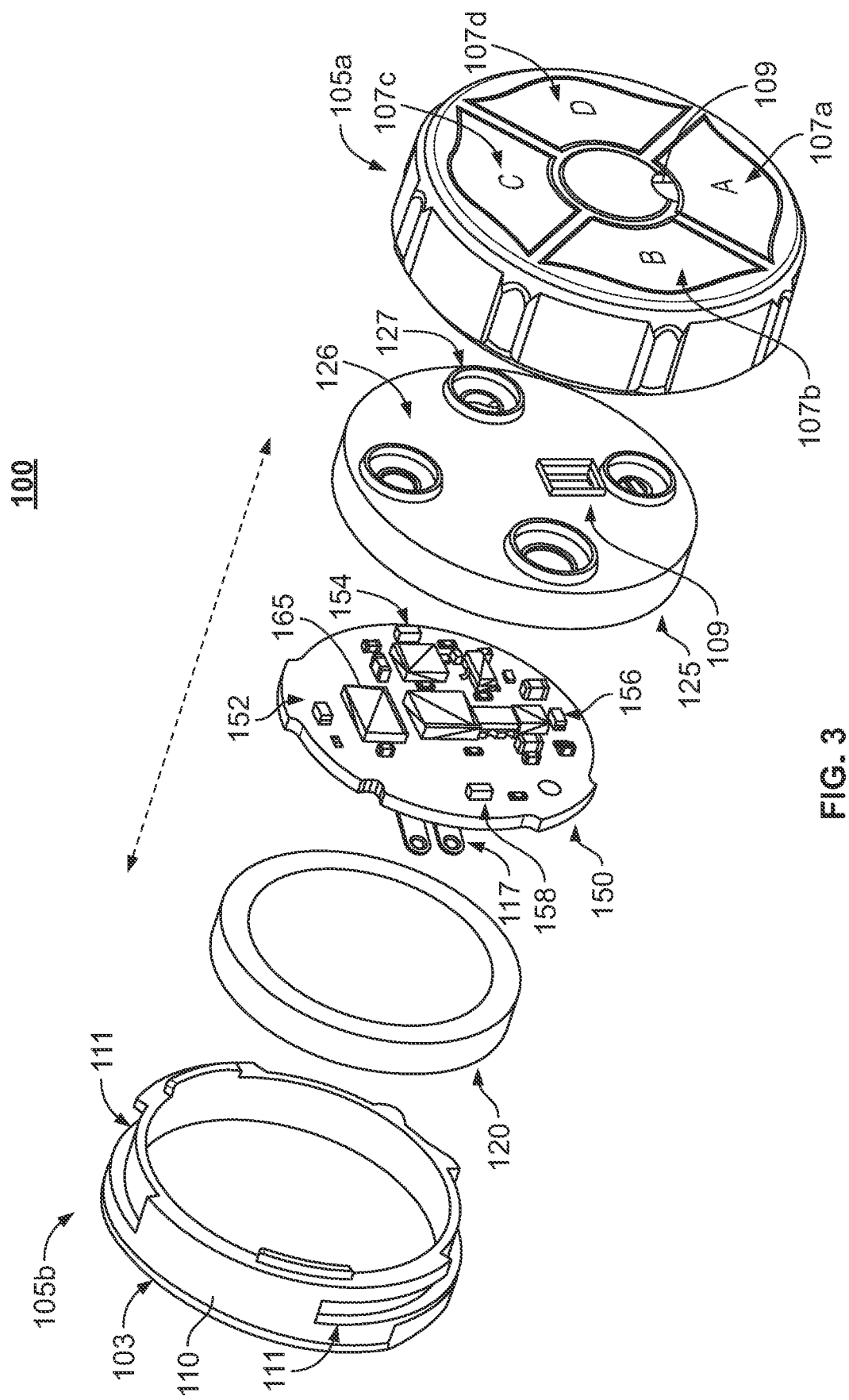
FIG. 3 is an exploded view of a relative directional indicator according to one embodiment.

Referring to FIGS. 2 and 3, in this embodiment, the RDI 100 includes an outer shell 105 formed from the engagement of front 105a and rear 105b reversibly-interconnectable shell members (the 'outer shell' is referred to as element 105 herein). In this example, the front shell member 105a includes relative directional indicators 107a-d on a front face 102 of the RDI 100. An adhesive is disposed on the rear face 103 of rear shell member 105b for mounting the RDI 100 in a selected location, e.g., within a SCBA facemask. Each of the relative directional indicators 107a-d can be individually controllably illuminable as described in greater detail herein. The outer shell 105 is configured to house at least a circuit board 150 supporting, inter alia, an electronic compass and related circuitry; a battery 120; and an optional gasket member 125.

In this embodiment, the outer shell 105 forms the outer surface of the RDI 100. Preferably, the outer shell 105 forms a water-proof or water-resistant outer surface, such that internal components of the RDI 100 are protected from water, sweat, soot, and other contaminants. The outer shell 105 can be a single-piece or multiple-piece design. The material of the outer shell 105 can be chosen according to preference, including, without limitation, polymers, composites, and other materials. In one embodiment, the outer shell has at least a two-piece design, such that the outer shell can be opened to access and change the battery of the RDI 100 and replace or service any other components of the RDI 100 if necessary. In an alternative embodiment, the outer shell 105 can be assembled to permanently seal the internal components of the RDI 100, e.g., battery 120, circuit board 150 and optional gasket 125. Battery 120 can be a rechargeable battery capable of being recharged wirelessly.

FIG. 3 illustrates RDI 100 in an exploded view along the dashed double-headed arrow. In this embodiment, the circuit board 150 includes a plurality of light-emitting diodes (LEDs) 152, 154, 156, 158 and is configured such that when the RDI 100 is assembled in an operational configuration, e.g., as illustrated in FIG. 2, there is only one possible orientation of the LEDs with respect to the relative directional indicators 107a-d. In other words, each LED is assigned to one relative directional indicator.

Figure 10:
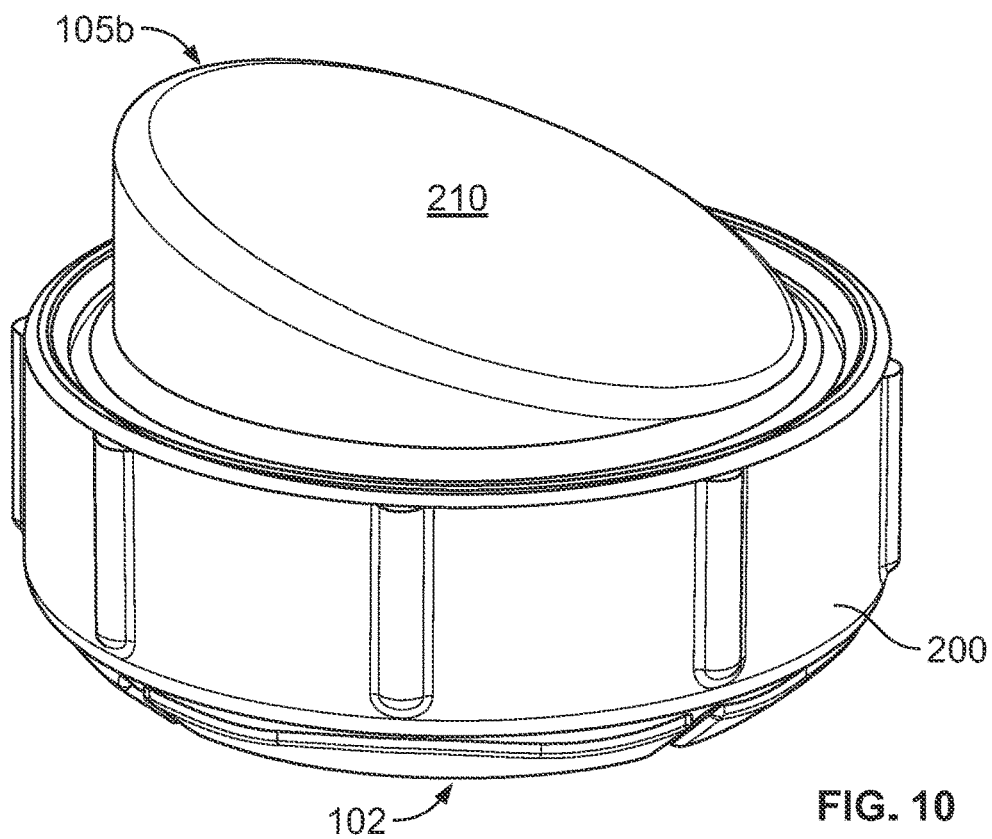
FIG. 10 illustrates front and rear components of a relative directional indicator, according to one alternative embodiment.
Figure 11:
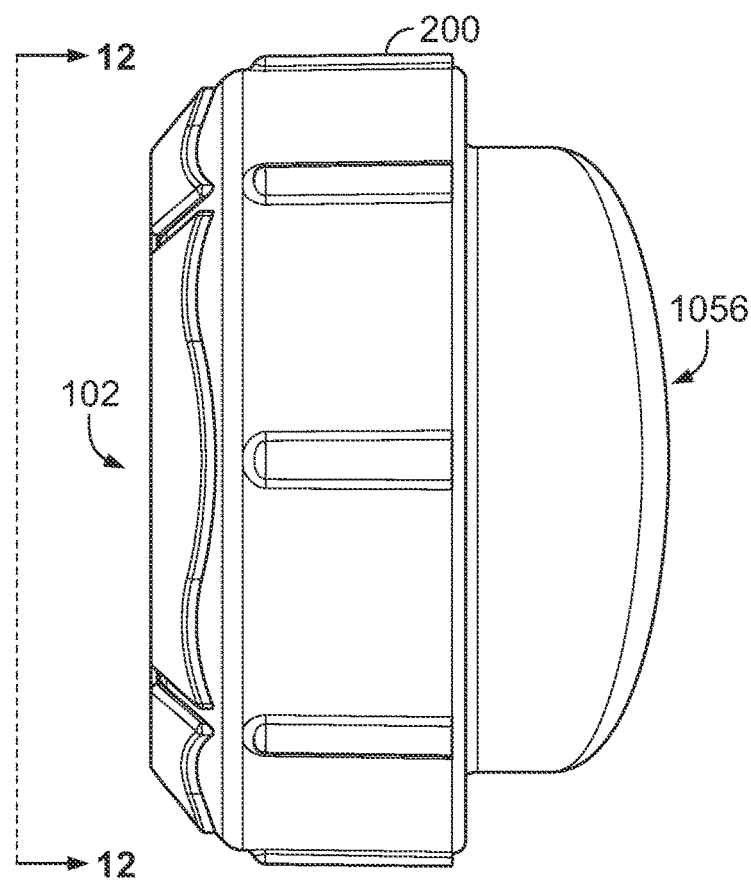
FIG. 11 is a side view of the alternative embodiment of FIG. 10.
Figure 12:
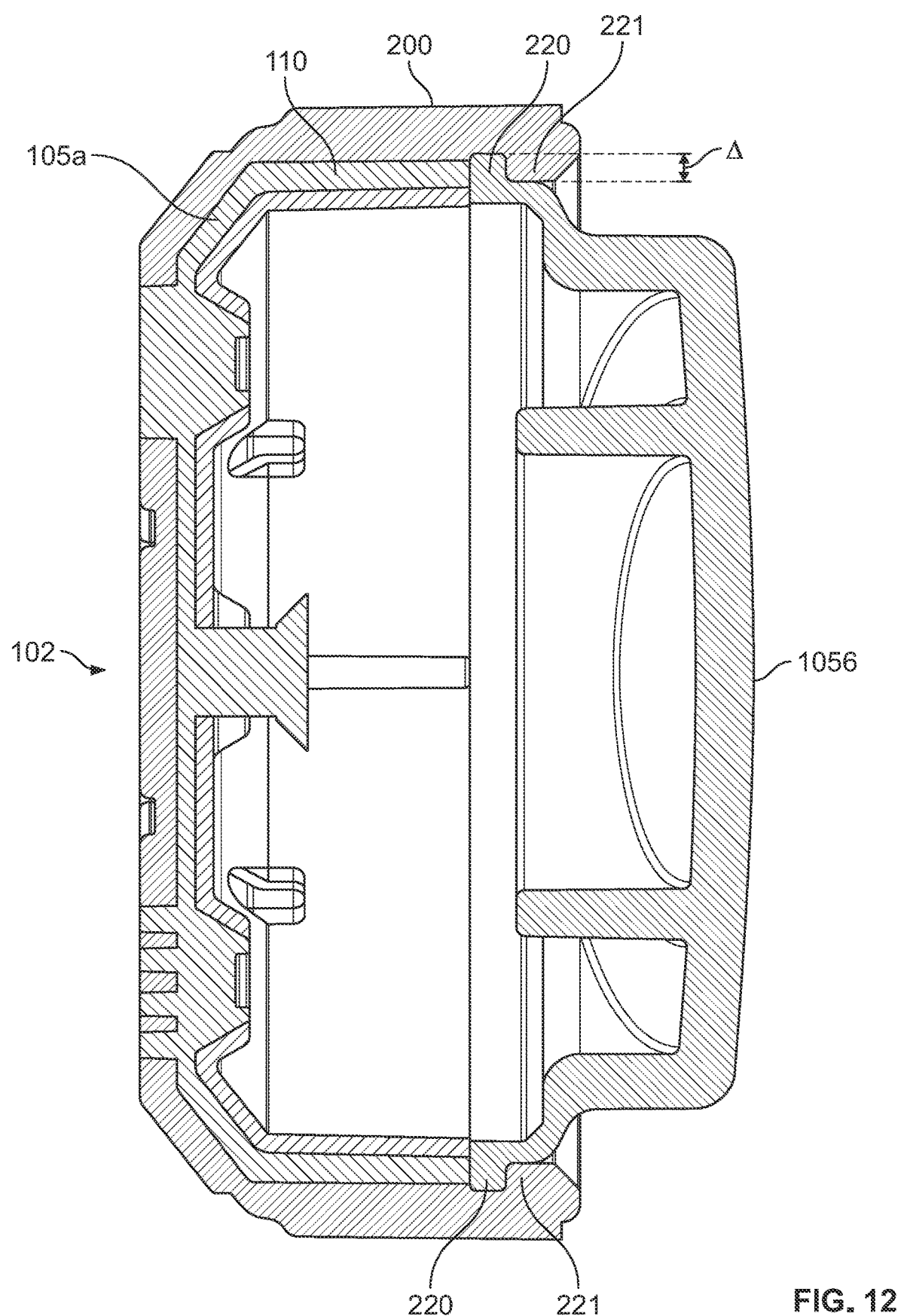
FIG. 12 is a cross-sectional view of the relative directional indicator illustrated in FIG. 11.

Referring briefly to FIGS. 10-12, in an alternative embodiment, the front (105a) and rear (105b) shell members can be held in engagement by a resilient jacket member 200 on the front shell member 105a. In this embodiment, the resilient jacket member 200 can be formed of a resilient material such as rubber and can be configured to cover all or a portion of the front (105a) shell member and furthermore extend in a circumferential manner beyond the shoulder member 110. The rear (105b) shell member has a sloped surface 210 that is configured to engage the inner surface of an SCBA mask, e.g., using an adhesive. As many SCBA masks are sloped outwardly from the wearer's face to accommodate regulators and other SCBA features, sloped surface 210 can present the front face 102 of the RDI in better orientation for viewing by the wearer. The angle of the sloped surface 210 can be selected as desired for attachment of the RDI onto a face shield or any other equipment.

Still referring to the alternative embodiment of FIGS. 10-12, in this embodiment, the rear (105b) shell member includes an outer circumferential shoulder 220 configured to engage an inner circumferential shoulder 221 of jacket 200. Jacket 200 thereby overlaps the outer circumferential shoulder 220 of the rear (105b) shell member by an amount A as illustrated in FIG. 12. Accordingly, when engaging the front (105a) and rear (105b) shell members, the jacket member can flex outwardly to receive and hold the rear shell member 105b in engagement with the front shell member 105a. In such an embodiment, the jacket member 200 can include windows on front face 102 to allow light from the one or more LED's 152, 154, 156, 158 to pass therethrough. Each of the windows can be formed in the shape of any indicia, for example, and without limitation, "A", "B", "C" or "D"; "Bow", "Port", "Starboard" or "Stern" or abbreviations thereof; or "1", "2", "3" or "4". It should be understood that while each of the preceding examples includes four relative direction indicia, the RDI 100 can include as many relative direction indicia as desired for a particular naming construct. In such an embodiment, the orientation of the jacket member can be fixed with respect to the LED's and circuit board 150 as described herein. The resilient jacket member can provide rotation of the RDI once it has been fixed to, e.g., a facemask so that the wearer can orient the device according to preference.

In this and other embodiments, the relative direction indicator can be in the form of a geometric shape. For example, referring to FIG. 2B, a top plan view of a simplified ship is shown. In this example, two curved lines 302, 303 extend from a common apex 301. Apex 301 can represent the bow of the ship, side 302 can represent the starboard side, side 303 can represent the port side, and side 304 can represent the stem. In such an embodiment, each of the sides can be individually illuminable so as to light up when the user is facing the associated side. For the apex 301, a top portion of each of the sides 302, 303 can be illuminable proximal to the apex.

In this and other embodiments, RDI 100 can include a wireless remote activator 310 in signal communication with a wireless receiver that itself is in signal communication with microprocessor 160. In such an embodiment, the remote activator can be configured to transmit signals to control powering the relative directional indicator assembly on or off. For example, the RDI 100 can be powered on by a single push of button 312; the RDI 100 can similarly be powered off by a triple click of button 312. Other button combinations will be apparent to those skilled in the art. Remote activator 310 can also be used for initiating the RDI 100 to assign a compass heading to one of the relative directional indicators. For example, a user can stand facing the "A" side of a building and press and hold button 312 for a predefined period of time, e.g., 3 seconds to instruct the RDI 100 to associate the anti-compass heading to the A-side of the building as described herein.

Referring back to FIGS. 2-3, in this embodiment, the RDI 100 includes a circuit board 150, on which is disposed electronic circuitry and components that enable the RDI 100 to provide relative directional indication as described herein, and which is described in greater detail below. The circuit board 150 includes battery contact terminals 117 through which the circuit board 150 receives power. In this example, the battery 120 is a button-type battery, such as, without limitation, a rechargeable lithium 3.6V LIR2450 battery, although other suitable batteries, including wirelessly-rechargeable batteries can be used.

In this and other embodiments, the RDI 100 can optionally include a gasket member 125 disposed between the circuit board 150 and the front shell member 105a. The gasket member 125 can provide protection of the circuitry and electronic components disposed on the circuit board 150 and can be slightly compressible, to keep the inner components of the RDI 100, e.g., battery 120, circuit board 150, in contact between the front (105a) and rear (105b) components of the outer shell 105. In embodiments utilizing an over-molded jacket member 200 as described with respect to FIGS. 10-12, a gasket member 125 may be unnecessary for keeping moisture and debris from the internal parts of the RDI 100.

In this embodiment, circuit board 150 includes four light-emitting diodes (LEDs) 152, 154, 156 and 158, respectively, arranged in a square pattern as illustrated. Gasket member 125 includes a dedicated aperture for each LED such that light emitted from diodes of the circuit board 150 can pass through to their respectively-assigned relative directional indicators 107a-d. For example, still referring to FIG. 3, apertures 126 and 127 are disposed such that light from diodes 152 and 154 can be independently transmitted to the "C" (107c) and "D" (107d) indicators, respectively, when activated.

In this and other embodiments, the gasket member 125 can optionally include a light sensor aperture 109 configured to allow ambient light from outside of the RDI 100 to pass through to a photosensor 180 disposed on the circuit board 150. Gasket member 125 can be made from an opaque material to reduce light bleed-through from a first LED, e.g., LED 152, to a non-assigned, adjacent relative directional indicator, e.g., relative directional indicator 107d. The light sensor aperture 109 can be configured to isolate only ambient light from outside the RDI 100, so that light emitted from any of the LEDs 152, 154, 156, 158 does not influence the ambient light measurements, as described in greater detail below. For example, aperture 109 can be circumferentially bordered by a raised portion or wall such that the raised portion or wall contacts the inner surface of the front component (105a), as illustrated, e.g., in FIG. 3. Such a configuration can be effective to prevent light emitted from any of the internal LEDs from reaching the photosensor 180.

Figure 4:
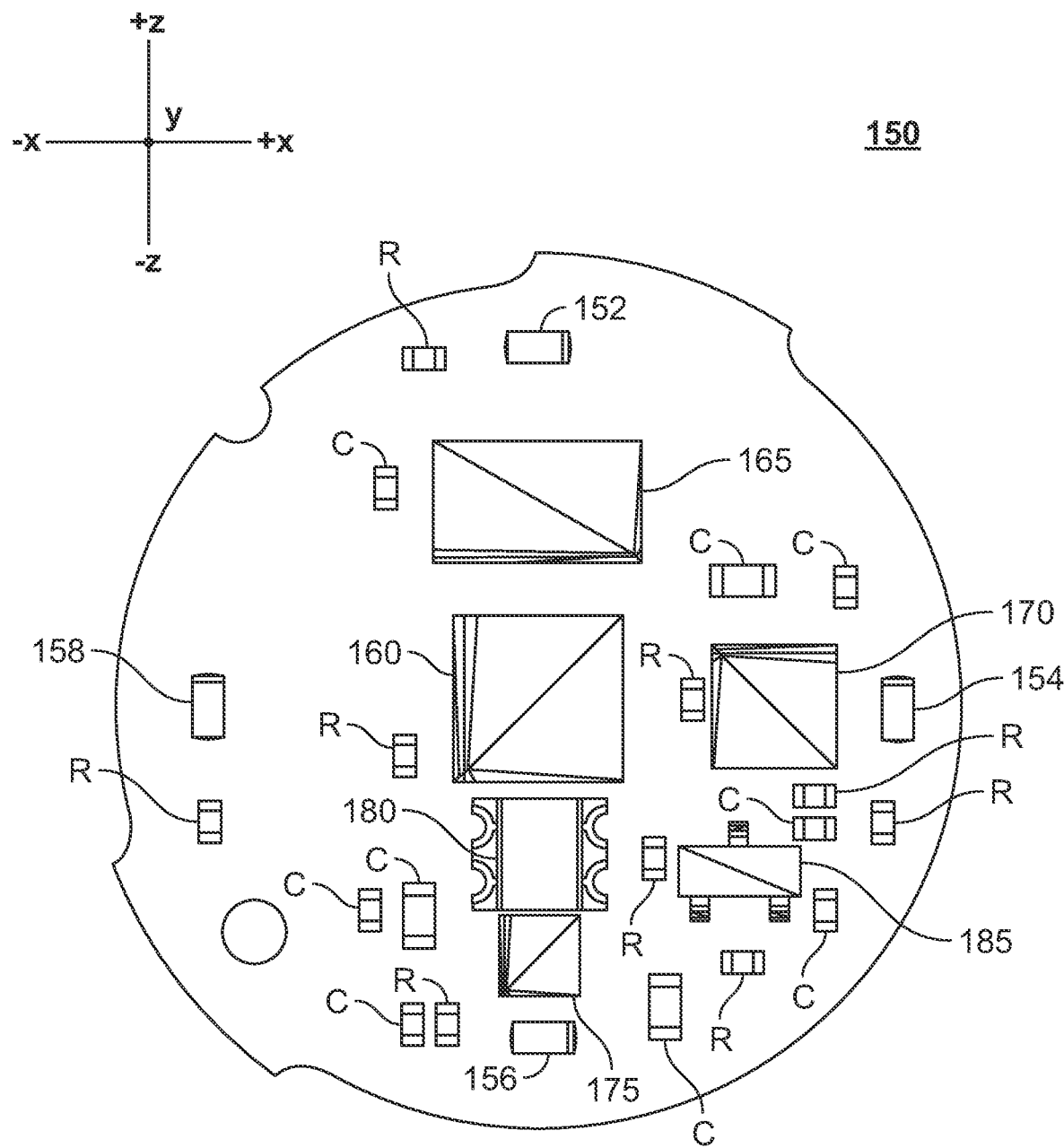
FIG. 4 is a circuit board of a relative directional indicator according to one embodiment.

Referring now to FIG. 4, a magnified view of circuit board 150 is shown according to one embodiment. In this embodiment, circuit board 150 supports the electronic components that are cooperatively configured to provide the RDI 100 relative directional indication functionality as described herein. The configuration of circuit board 150 is one of many possible approaches; the configuration and components can be modified or reoriented to achieve certain desired factors. Resistors R and capacitors C are labeled in FIG. 4 to show the configuration of those elements, according to one embodiment.

In this embodiment, circuit board 150 includes an electronic microcontroller 160 in electronic communication with the first (152), second (154), third (156) and fourth (158) LED's, an accelerometer 165, an electronic compass 170, a photosensor 180, a voltage regulator 175 and a field-effect transistor (FET) 185.

In this embodiment, microcontroller 160 is configured to execute logic commands for receiving a compass heading from the electronic compass 170; assigning the measured compass heading to a component of a defined naming construct that correlates with a chosen structural feature that itself is used as a point of orientation or reference in locating or visualizing other structural features; calculating the anti-heading so that the RDI functions from the perspective of the interior of the structure; optionally mapping additional calculated compass headings to one or more additional components of the naming construct; and, after such assignment and optional mapping has been made, causing the correct relative directional indicator to be activated, illuminated or displayed according to the direction that the RDI is facing.

A functional example of the preceding paragraph is as follows: the naming construct is the aforementioned A, B, C, D sides of a structure, correlating to the front side, left side, rear side and right side, respectively of a house having four exterior walls oriented in a rectangular shape. The RDI is being used by a firefighter who will be working inside the structure and needs to be able to determine the A, B, C and D sides. In this example, the RDI is activated from outside the structure (as described in greater detail below) and facing the A-side of the house, which, in this example, is a compass heading of northeast relative to the RDI. The microcontroller receives a compass heading of 0° (N), subtracts 180° from this value (the anti-heading), so as to display relative direction from the perspective of the interior of the structure, and assigns the resultant heading value, 180°, to the "A" relative direction indicator, e.g., relative directional indicator 107a in FIG. 2. Next, the microcontroller can optionally calculate that the B side of the house correlates to compass heading ninety degrees from that of the "A" relative direction indicator, i.e., 270°, and assigns that heading to the "B" relative direction indicator, e.g., 107*b* in FIG. 2. Continuing in like fashion, the "C" relative direction indicator can be assigned a heading of 0° and the "D" relative direction indicator can be assigned a heading of 90°.

Logic commands may be stored on the microcontroller 160 or in a data repository (not shown in FIG. 4) in electronic communication with the microcontroller 160. Microcontroller 160 can be any suitable microcontroller known in the art or custom designed. One exemplary, non-limiting microcontroller suitable for use is a PIC16F18345 microcontroller provided by Microchip Technology Inc., having headquarters in Chandler, Ariz., USA. This microcontroller can be particularly favorable due to its low power consumption which can be useful in prolonging battery life. In a preferred embodiment, the microchip incorporates, or is in signal communication with a module to supply sensor fusion to enable the combination of data derived from multiple sources, e.g., the electronic compass and an electronic gyroscope module to accurately determine compass heading values irrespective of, for example, the horizontal tilt or axial rotation angle (e.g., along the dashed line in FIG. 3) of the RDI 100.

In this embodiment, the electronic compass 170 and related circuitry of the body of the RDI 100 may be any electronic compass known in the art, but preferably is a small electronic compass to limit the size of the body and, therefore, the RDI 100 as a whole. The electronic compass can be, or integrate a magnetometer which, as those skilled in the art will recognize, can measure the direction and strength of Earth's magnetic field, such that the electronic compass 170 can determine the direction it is pointing, facing or being moved. In this embodiment, the electronic compass 170 is in electronic signal communication with at least the microcontroller 160 component of the RDI 100 and can be activated by the microcontroller 160 to query and/or receive a compass heading from the electronic compass 170. The microcontroller 160 can, for example, query the electronic compass 170 for heading information according to a pre-set frequency, e.g., once a second, once every five seconds, continuously, or by any other desired frequency. Alternatively, the electronic compass can continuously output heading information which is continually available to the microcontroller 160.

In one embodiment, electronic compass 170 is a 3-axis digital compass configured for low-field magnetic directional sensing. In such an embodiment, the electronic compass 170 can be electronically gimballed so that the sensed direction is independent of tilt (e.g., from the z-axis) with respect to a horizontal plane generally defined by the Earth's surface (e.g., x-y axis). Electronic gimballing can be particularly important for determining accurate heading information when considering the movements and actions of firefighters when performing various firefighting duties.

For example, it is common that firefighters will move through structures in a variety of positions: a firefighter may walk upright into a building, and then transition to a crawling position upon encountering heat or smoke, for example; a firefighter may crawl with his facemask oriented at a 45-degree angle to the floor versus perpendicular or parallel. Accordingly, the orientation of the electronic compass 170 may transition from an orientation generally in the z-x plane as illustrated in FIG. 4 when the firefighter is standing, to one that is tilted forward, toward the y-axis as illustrated in FIG. 4 when the firefighter is crawling. Preferably, the electronic compass 170 can adjust for a variety of orientations in real time and continuously measure accurate headings. One exemplary, non-limiting electronic compass 170 that can be used in a DI is the HMC5883L 3-Axis Digital Compass IC provided by Honeywell International, Inc., Morristown, N.J., USA.

In a preferred embodiment, heading information is provided by an electronic compass that incorporates an accelerometer, gyroscope and magnetometer working in concert via sensor fusion to allow true orientation in 3-dimensional space. Such an electronic compass can provide accurate compass headings regardless of the orientation of the RDI 100 which can be beneficial when the user is continually moving, or when the user is tilting the RDI 100 up and down. One such electronic compass is Model No. BN0055 produced by Bosch Sensortec GmbH, Reutlingen, Germany. If such an electronic compass is used, the use of a separate accelerometer 165 and field-effect transistor 185, described below, may be obviated.

FET 185 is a metal-oxide semiconductor configured to provide power management in particularly with respect to accelerometer 165, if a stand-alone accelerometer is used. In general, FET 185 can be configured to provide a power source to the accelerometer 165 when the RDI 100 is in a standby mode for the purpose of monitoring for movement. The microcontroller logic of the RDI 100 can be configured such that movement of the accelerometer during a standby mode can trigger the RDI 100 to switch to an 'active' mode. While many MOSFETs are commercially available, one exemplary FET 185 is part number ZXM61P02F manufactured by Diodes Incorporated, having a corporate headquarters in Plano, Tex., USA.

In this embodiment, optional photosensor 180 is configured to measure ambient light in the vicinity of the RDI 100 so that the brightness output of the LED's 152, 154, 156, 158 can be adjusted for the user accordingly. For example, in this embodiment, microcontroller 160 can be configured to increase or decrease the light output intensity or brightness of the LED's if an output voltage of the photosensor 180 is above or below a predetermined photosensor threshold output value, respectively. One non-limiting, exemplary photosensor suitable for use as described herein is a silicon PIN photodiode, part no. PD15-22B/TR8 manufactured by Everlight Electronics Co., LTD, Taiwan.

In this embodiment, voltage regulator 175 is configured to maintain a substantially constant voltage level for the electronic components of the RDI 100 and is particularly configured to maintain the lowest voltage level necessary for proper electronic functionality while maximizing battery life. One exemplary, non-limiting voltage regulator suitable for use as described herein is the Semtech TS14001 nanoSmart® ultra-low-power linear regulator provided by Semtech Corporation, having corporate headquarters in Camarillo, Calif., USA.

In general, microcontroller 160 is configured to, inter alia: receive a measured compass heading MCH from the electronic compass 170 corresponding to the facing direction of the RDI 100, e.g., the direction that the user is facing; optionally receive a relative bearing initiation signal; determine a reverse compass heading value RCHV that is 180 compass degrees from the MCH; determine a relative heading correction factor RHCF corresponding to the difference between a north or approximately north heading (whether true north or magnetic north, depending on the configuration of the electronic compass 170) and the facing direction of the RDI 100; and map relative headings to the various RDI's; and cause activation (e.g., illuminate) the appropriate RDI when a measured compass heading, having the RHCF applied, matches or substantially matches one of the relative direction values corresponding to one or more of the RDI's. These processes are now further detailed with reference to FIGS. 7-9.

Figure 7:
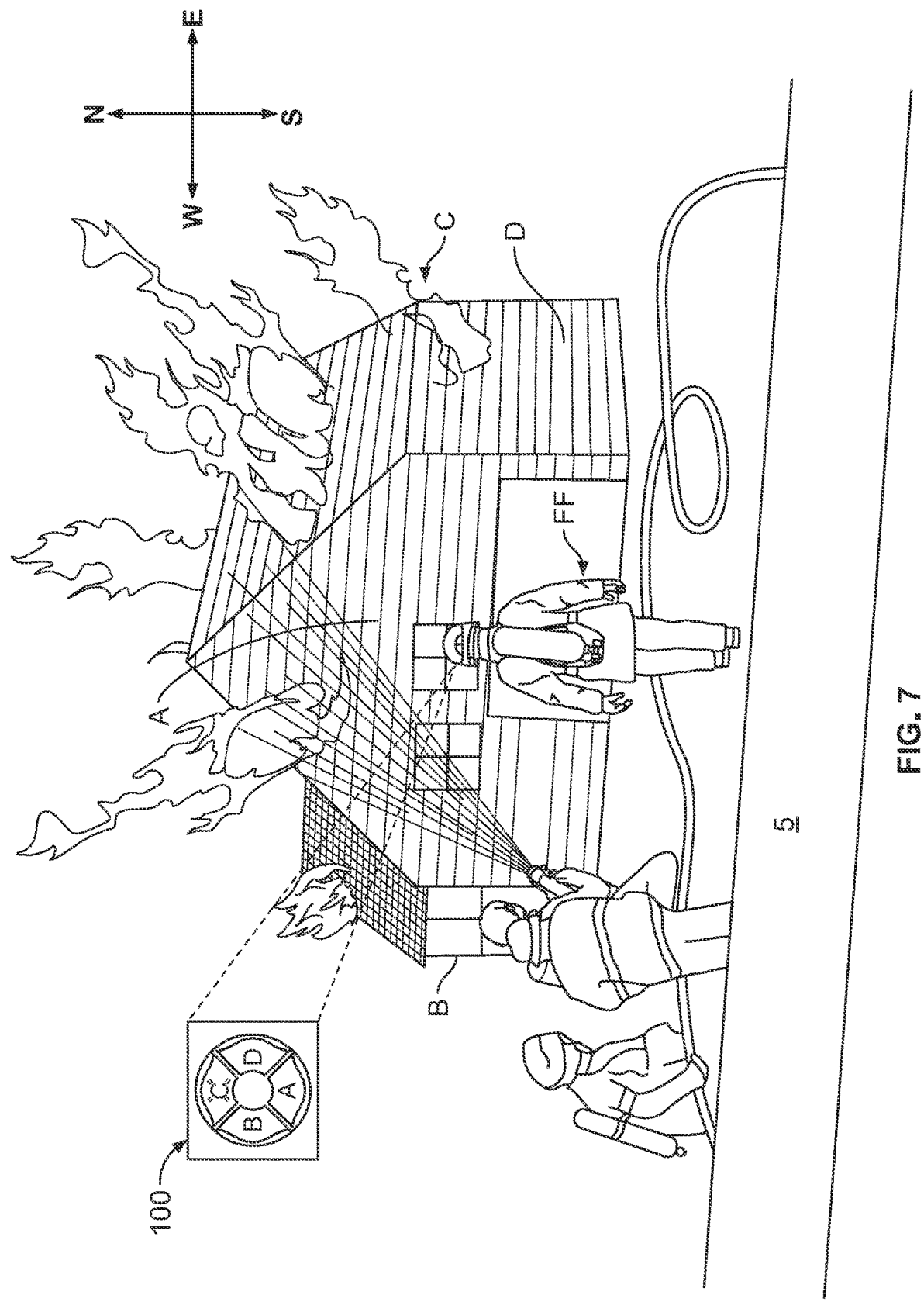
FIG. 7 illustrates an exemplary fire scene and a user's orientation to a structure on fire.

FIG. 7 illustrates a structure fire scene. The structure on fire in FIG. 7 is a residential structure having a "side A" facing and parallel with the street S near which the structure is located. In this and other embodiments and examples discussed, it will be recognized that reference to structure sides "A," "B," etc. as used herein is one of many possible naming conventions. Other naming rules can be interchanged with that discussed here as necessary or desired to conform to practices or conventions of particular departments, agencies, uses, etc.

In this example, firefighter FF is facing a substantially north heading, which is arbitrary in this example and coincides with the orientation of the structure itself. The residence is situated in this example such that the front face A and rear face C are substantially parallel with a line running east-to-west, and the sides of the house B and D, respectively, are substantially parallel with a line running north-to-south. In this example, the firefighter is utilizing an RDI 100 within a facemask, the display panel of which is illustrated in the magnified portion of FIG. 7. In this example, the relative directional indicator "C" is activated (as indicated by the hash lines) because the firefighter is facing side C (the rear side of the structure). It is important to note that even though in the example of FIG. 7 the firefighter is also facing side A, the RDI 100 is configured to use a central, interior reference within the structure to determine which relative heading the user is facing. For example, if the firefighter FF in FIG. 7 turned ninety degrees to the left, the "C" relative directional indicator would be deactivated, and the "B" relative directional indictor would be activated. Similarly, if the firefighter turned one hundred eighty degrees (so his back was facing the residence), the "A" relative directional indicator would be activated because, again, the RDI 100 uses a reference framework as if the user is within the structure.

Figure 8:
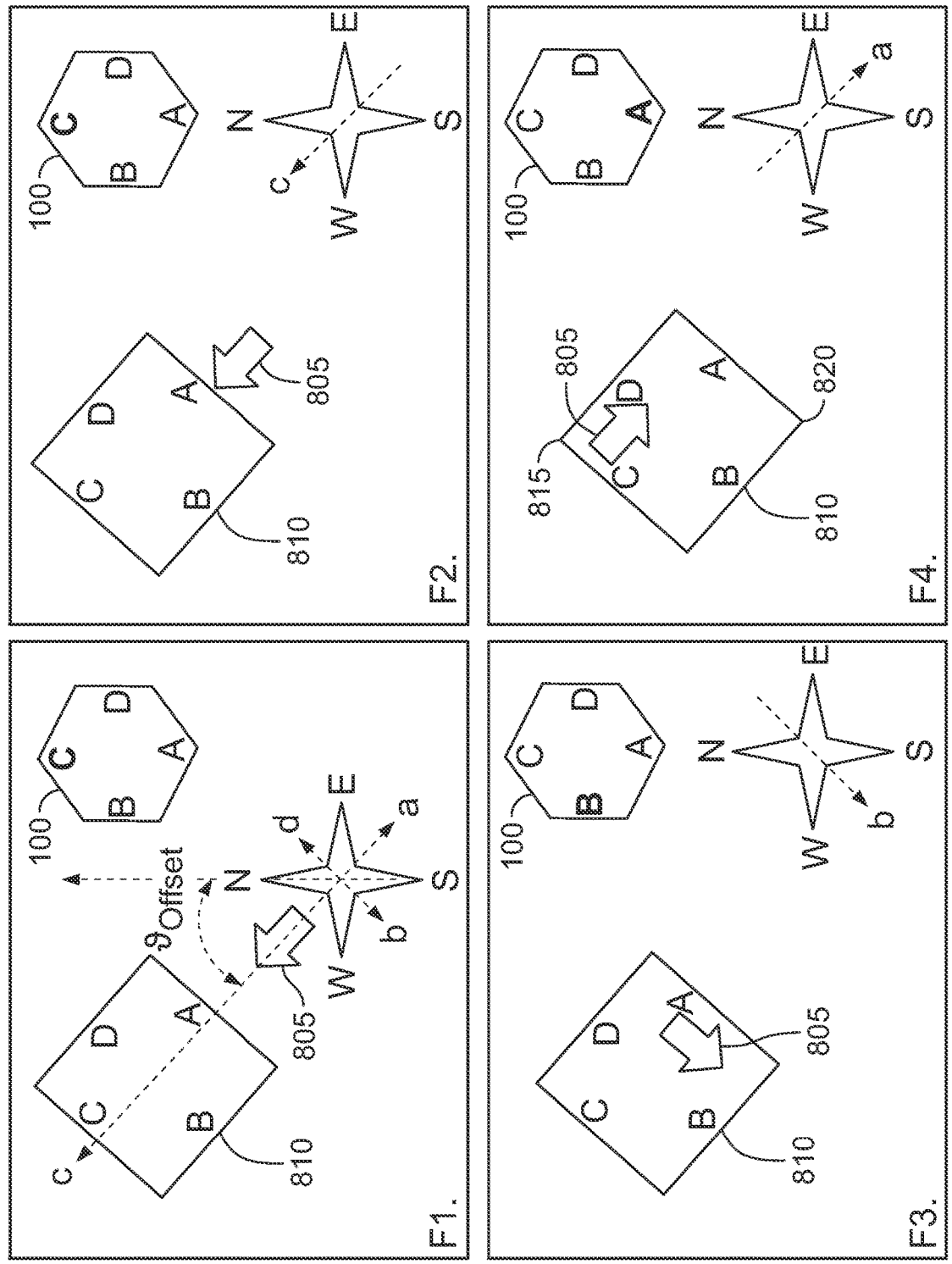
FIG. 8 illustrates relative directional indicator correlation of structure naming convention to compass direction according to one embodiment.
Figure 9:
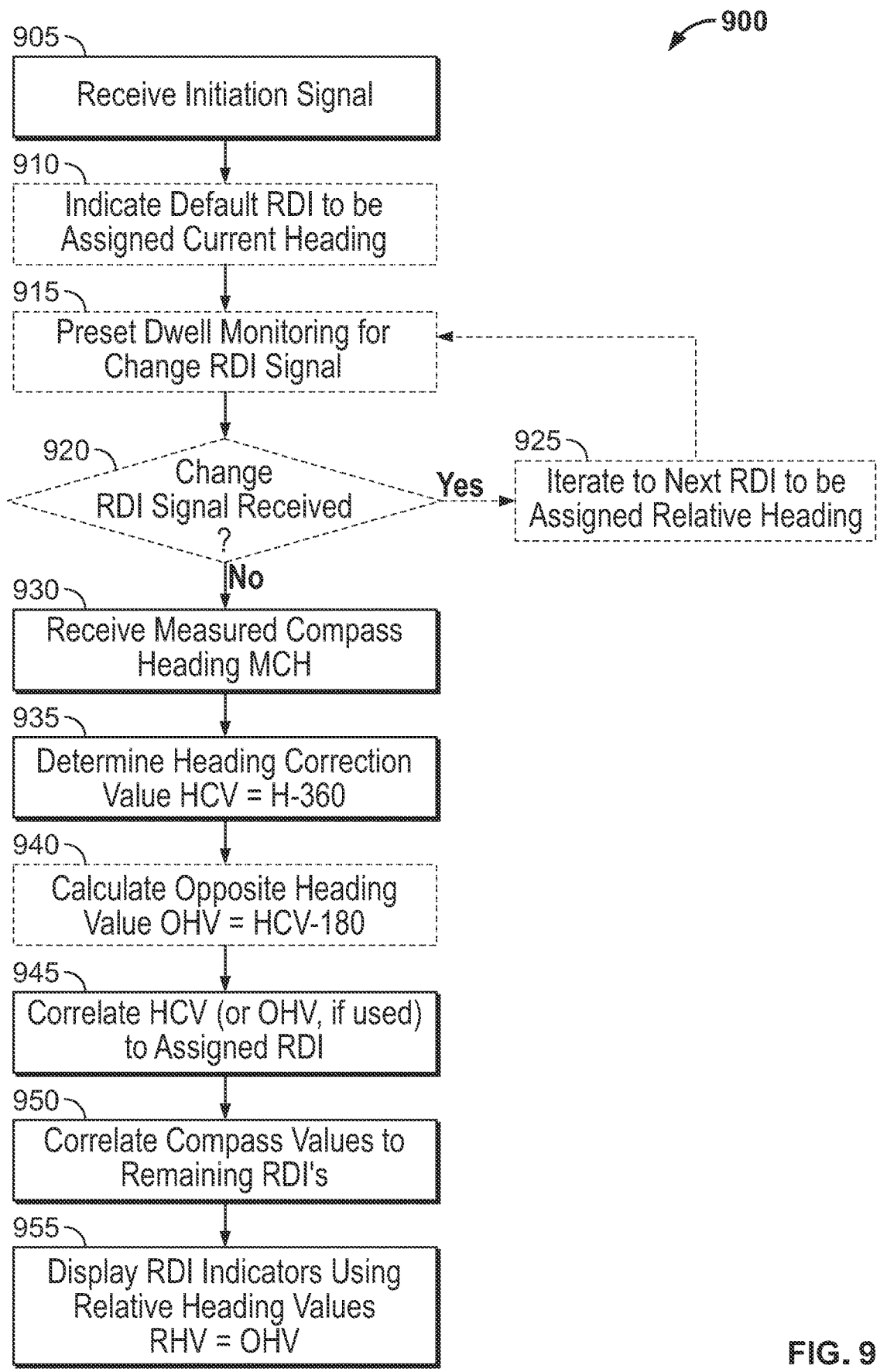
FIG. 9 is a flowchart for correlating a structural feature to a structural naming convention according to one embodiment.

Referring now to FIGS. 8 and 9, the initiation of the RDI 100 and determination of relative headings and assignment of those relative headings to an exemplary naming convention is described according to one embodiment. As with other examples, it should be understood that the A-B-C-D structure-side naming convention discussed herein is but one of many possible conventions that can be used with a RDI. For example, the A, B, C and D indicia of the front shell member 105a can be exchanged or replaced using other naming conventions, languages, symbols, words or other indicia as desired to comport with a particular naming convention.

FIG. 9 illustrates a process 900 for initiating and assigning relative headings to each of the relative directional indicators of an RDI 100, according to one embodiment. At step 905, microcontroller 160 can receive an initiation signal to initiate functioning of the RDI 100. An initiation signal can be, e.g., turning the RDI 100 on via a switch, button or other activation mechanism to power up the unit and begin an initiation sequence. This would be an example of an automatic initiation process. Alternatively, an initiation signal can be one in which the user presses the power button for a prolonged period of time, for example, and without limitation, 3 seconds. In yet another example, the RDI can include a button that is separate from the power button that, when pressed, sends an initiation signal to the microcontroller 160, which would be an example of a manual initiation sequence.

After receiving an initiation signal, the process 900 moves to the steps for correlating (mapping) compass headings with the relative directional indicators of the RDI 100. Microcontroller 160 can be configured such that during the process of initiating and assigning relative headings to each of the relative directional indicators of an RDI 100, an assumption is made that the firefighter is facing the "A" side of the building. Steps 910-925, however, illustrate optional steps for correlating a compass heading to a selected one of the available relative directional indicators, according to one embodiment.

At optional step 910, microcontroller 160 causes one of the relative directional indicators to be highlighted, e.g., activate, blink or become brighter to indicate that the highlighted indicator is the one that is about to be correlated to the compass heading that the RDI is facing. As an option, microcontroller 160 can be configured to highlight a default relative directional indicator, such as, and without limitation, the "A" indicator 107a.

Next, at optional step 915, the microcontroller 160 can be configured to dwell for a preset length of time and monitor for a signal to change the RDI that the current facing direction of the RDI 100 should be assigned to. For example, referring back to FIG. 7, if the firefighter FF were standing on the "D" side of the structure facing west, he could desire to set the RDI 100 so that his current facing direction corresponds to the "B" side of the structure. A user may toggle through the available relative directional indicators during the dwell time to select which one will be assigned to the current facing direction of the RDI 100. The signal to change the assigning RDI can be, for example, a signal received from the accelerometer corresponding to a percussive tap or sequence thereof. For example, if the "A" relative directional indicator 107a is blinking, the user can perform a single tap to iterate through each of the "B," "C" and "D" relative directional indicators 107b-d, respectively. Alternatively, an exterior button may be used. In yet another option, the RDI can include a microphone in signal communication with microcontroller 160 and software to enable the RDI to receive voice commands. In such an embodiment, the user could speak the word "next" to cause the microcontroller to iterate to another relative directional indicator and cause it to blink. This process corresponds to steps 920 and 925, respectively. Thus, process 900 includes an optional loop (incorporating steps 915, 920 and 925) allowing the user to assign a selected one of the relative directional indicators to the current heading of the RDI 100.

Next, at step 930, the microcontroller receives a measured compass heading MCH from the electronic compass. Referring to frame F1 in FIG. 8, in this example, the arrow 805 represents a direction that the RDI 100 is facing, which, in normal circumstances will correspond to the direction that a user such as a firefighter is facing, having an RDI 100 installed within his facepiece mask. In this example, the RDI 100 is facing northwest (MCH=approximately 315°) at an angle $\theta_{offset}$=−45° from due north. In this example, a structure 810 has four external sides A, B, C and D as illustrated and both the A and C sides are aligned substantially parallel with a southwest-to-northeast line. The lowercase and scripted a, b, c and d indicators overlaid upon the compass rose in FIG. 8 correspond to the A, B, C and D relative directional indicators of RDI 100. Thus, in this example, according to the relative orientations of the structure 810 and user (arrow 805), and the naming convention used, the RDI 100 assigns the northwest heading to the "C" relative directional indicator 107c of RDI 100.

Next, at step 935, a heading correction value HCV can be determined that represents the compass offset between the cardinal north, south, east and west directions and the direction that the RDI 100 is facing. When an RDI 100 utilizes relative directional indicia arranged in a pattern, such as a diamond shape as illustrated in FIG. 8, the HCV can also represent the offset between the cardinal north, south, east and west directions relative to the arrangement of relative directional indicia, wherein, in this example, "C" would represent north, "A" would represent south, etc. In other words, referring to frame F1 and FIG. 8, the HCV can represent the angle offset between the north-south line of the compass and a line running perpendicular through the "A" and "C" sides of the structure 810 (the dashed a-c line).

Next, at step 940, an optional opposite heading value OHV can be determined. In this embodiment, the OHV is the anti-heading, i.e., 180 degrees from the measured compass heading MCH. It should be noted that step 940 may only be necessary when an RDI 100 is configured to automatically set the facing direction of the RDI to the "A" side, that is, if optional steps 915, 920 and 925 are not carried out. Without wishing to be bound by theory, it is postulated that users may find the initial calibration of the current facing direction to relative directional indicator "A" (107a) more intuitive, merely coinciding with the starting order of the alphabet and because emergency personnel typically arrive to a scene where the side of the structure facing the street is conventionally termed the "A" side.

Alternatively, in this and other embodiments, during the initial setup and initiation steps of this process 900, the RDI 100 can be configured to automatically assign the facing direction of the RDI to the "C" side, in which case step 940 can be bypassed. It should be noted, however, that some structures may not have a rear "C" side that is parallel with the "A" side; this could be a consideration in training personnel when using the RDI 100. For example, a policy may direct users to calibrate the RDI 100 when facing the "A" side, e.g., as firefighter FF is illustrated in FIG. 7.

Next, at step 945, the heading compass value HCV is assigned to the relative directional indicator that has been selected, or to the default relative directional indicator that is used during this initiation process. Referring again to FIG. 8, frame F1, in this example, if the RDI 100 is configured to allow a user to select the structure side to assign to their facing direction, and that user has selected side "C," then the "C" relative directional indicator can be assigned to the compass heading 315° or northwest. Alternatively, if the RDI 100 is configured to automatically assign the facing direction to side "A" during this initiation process, then the "A" relative directional indicator can be assigned to a compass heading of 135° or southeast. In other words, in this example where four relative directional indicators 107a-d are arranged in a diamond-like formation, correlating the facing direction of the RDI 100 with the heading compass value HCV has the effect of transposing the relative directional indicators (e.g., 107a-d) onto a compass rose shifted by $\theta_{offset}$.

At step 950, true or magnetic compass heading values as measured by the electronic compass are assigned to as many relative directional indicators as are being used by the RDI 100, applying the heading correction value HCV. In the example of FIG. 8, frame F1, once initialized to determine the reference heading of the facing direction of the RDI 100, the relative directional indicators of RDI 100 would correspond as: A=135°, B=225°, C=315° and D=45° to measured compass headings.

Throughout this disclosure, it should be understood that microcontroller 160 can be configured to allow for a select amount of deviation or uncertainty in the determination of which relative directional indicator 107a-d to activate. Keeping with the above example, for instance, the RDI 100 can be configured such that the "A" side indicator is activated when the measured compass heading is within +/−20 degrees of 135° (i.e., between 115° and 155°); in such a case, the same range of deviation can be applied to activation of each of the other relative directional indicators. In other embodiments, the deviation angle may be more restricted to provide for higher resolution, e.g., +/−10 degrees, +/−5 degrees, etc. In this and other embodiments, microcontroller 160 can be configured to alert the user of the RDI 100 if the accuracy of a heading determination is below a certain threshold or receives conflicting or out-of-range signals from electronic compass 170. For example, if the microcontroller 160 receives an erroneous or inaccurate signal from electronic compass 170, all of the LEDs can be flashed together; or, alternatively, a single indicium can be flashed to indicate to the user that while the single indicium is the best heading determination, the heading may be inaccurate.

At step 955, the RDI begins to operate in a working mode as described herein to activate or otherwise display a relative directional indicator according to the direction that the RDI 100 is facing. The RDI can continue in a working mode until the unit is powered off or enters a low-power, hibernation state.

FIG. 8 illustrates use of the RDI 100 wherein the arrow 805 represents a user. In this example, frame F1 illustrates that the RDI 100 has been initiated such that a measured compass heading of northwest or 315° corresponds to side "C," as described. In frame F2 of FIG. 8, the arrow 805 illustrates the user moving into the structure 810, still facing northwest, and wherein, accordingly, relative directional indicator "C" (107c) is activated, indicated by the bold lettering. Frame F3 of FIG. 8 illustrates the user turning left after entering the structure, corresponding to a compass heading of southwest or 225°. Accordingly, since the user is facing the "B" side of the structure, the "B" relative directional indicator 107b has been activated in the RDI 100 (again illustrated by bold lettering in FIG. 8). Lastly, in frame F4 of FIG. 8, the user (and RDI 100) are facing toward a compass heading of southeast or 135°; accordingly, relative directional indicator "A" 107a is activated. In a normal operating mode, the RDI 100 will continue to update the activated relative directional indicator depending on which way the RDI 100 is facing.

In this and other embodiments, the RDI 100 can utilize a display as an alternative to individual relative directional indicators 107a-d. In such an embodiment, the display can be, without limitation, an electronic display such as an LED or organic LED (OLED) in signal communication with microcontroller 160. The RDI 100 can include driver chips, microprocessors, software storage repositories and other components as necessary, and be configured to cause the display to indicate a relative directional heading as described herein. One non-limiting example of a display device is a 128×32 pixel, I2C miniature monochrome OLED graphic display, Model LCD128X320LEDI2C, available at the time of this disclosure from SK Pang Electronics Ltd, Harlow, Essex, United Kingdom.

In such an embodiment, the display can be configured to show one or more letters, words or phrases, symbols or other indicia to communicate to the user the relative heading of the RDI 100. For example, the display can show phrases such as "SIDE A", "SIDE B", etc., which correlate to the disclosure herein. Additionally, the measured compass heading value can be displayed concurrently with a relative heading, for example, "SIDE A-135°-NW", to give the user additional useful information. Similarly, an RDI 100 having relative directional indicators arranged on a face, similar to RDI 100 shown in FIG. 3, can have an additional display element (not shown in FIG. 3) for displaying the measured compass heading that corresponds to the activated relative directional indicator. In such an embodiment, the display can be positioned, for example, in the center of the face for easy reference. In another example, the display portion of the RDI can include the outline of a ship as viewed from above. In this example, a portion of the ship corresponding to the facing direction of the RDI 100 can be illuminated to show, for example, that the user is facing the bow, stern, port or starboard sides.

In an alternative embodiment, the RDI 100 can be configured to project an image corresponding to the relative directional indicators used onto a surface, much like a heads-up display. For example, the RDI 100 can project relative directional heading information onto the interior surface of a face shield.

In another embodiment, RDI 100 can be integrated with thermal cameras often used by firefighters. In such an embodiment, the RDI 100 can be calibrated as described herein to assign a compass heading to a relative directional indicator by, for example, pointing the thermal camera at a chosen side of a building and performing the initiation sequence described above, similar to a user facing the chosen building side. In this case, the relative direction information can be displayed as a portion of the thermal camera display so that a user may visualize both thermal imagery and relative directional information on one screen.

In this embodiment, microcontroller 160 can be configured such that LEDs corresponding to a relative heading are activated according to a desired refresh rate. For example, a compass heading can be measured and received according to any desired frequency, e.g., every 65 ms, every 200 ms, 10 readings per second, 5 readings per second, once every second, twice every second, once every five seconds, etc. The desired frequency can be dependent on the state of the RDI 100, e.g., in an active or standby mode as described herein. While the embodiment of RDI 100 shows four relative directional indicators, it will be understood that a RDI can be configured to show as many relative directional indicators as desired, e.g., to include "D", "E", "F" or other indicators. Other modifications and alternative embodiments can be made according to desired functionality or to comport with department or agency practices.

In this embodiment, the battery 120 of the RDI 100 is configured to provide power to all electronic components requiring power. The battery may be of any design or type known in the art, but preferably is a small battery in order to limit the size of the body and, therefore, the RDI 100 as a whole. Furthermore, the battery is preferably one which has a long battery life to limit the number of battery changes necessary and to increase the available operational time span of the RDI 100.

For example, and without limitation, the battery may be of a watch-type lithium, silver oxide, zinc air, or similar type of button or coin battery. In one embodiment, the outer shell of the body of the RDI 100 can be configured in such a way (such as a two-piece design) that the battery may be easily replaced when necessary. In one embodiment, the battery may be rechargeable, in which case the outer shell of the body of the RDI 100 can include a suitable receptacle and components for receiving a power cord such as a USB-mini plug, so as to be able to plug in the RDI for recharging the battery. Optionally, in another embodiment, the battery can be of the type that is rechargeable by non-corded methods, e.g., through the use of magnetic fields, ultrasound, light, or other methods. In such an embodiment, the shell of the RDI 100 can be of a one-piece design or, alternatively, permanently sealed to prevent moisture and contaminants from entering the interior portion of the RDI 100.

In one embodiment, the RDI 100 can include an exteriorly-accessible power button configured to turn the RDI 100 on or off to save battery life when the RDI 100 is not being used, for example when the firefighter or other user is not on call or is between calls. However, more preferably, the RDI can be configured to automatically turn on when it senses motion via accelerometer, and off when it is not in use, for example, when no motion has been detected for a predetermined period, such that the aforementioned power button is not required.

While it can be preferable that the body of the RDI 100 be small and be configured in such a way as to be able to be used with the face masks of existing SCBAs, alternatively the body can be configured such that it is incorporated into the face mask itself or an existing replacement part for the face mask in order to be permanently integrated into the face mask. In such an event, the body can be configured to have the shape of, and incorporate any other aspects of, such a replacement part or portion of the face mask.

In this and other embodiments, the at least one relative directional indicator may be displayed and take a variety of forms based upon the needs of the firefighter or other user. For example, if the firefighter desires only to be able to determine which structure side he is predominantly facing, then the RDI can be configured to only activate one of the relative directional indicators based on which relative heading indicator most closely matches the measured compass heading, having the heading correction value HCV applied.

In another example, if the firefighter desires to have greater details of the direction the firefighter is facing or moving, then multiple relative directional indicators can be activated. For example, referring back to frame F4 of FIG. 8, if the firefighter were to turn south (keeping with the compass orientation as illustrated in FIG. 8), facing from structure corner 815 to corner 820, he would be equally facing sides A and B of the structure. Accordingly, in this embodiment, relative directional indicators "A" and "B" can be activated by activating the appropriate LEDs (156, 158, respectively). If the firefighter desires even greater detail about the direction in which the firefighter is facing or moving, then the at least one relative directional indicator can, for example, include an alpha-numeric display that can display the direction in which the firefighter is facing or moving in the form of a numerical bearing or a more detailed cardinal or ordinal direction (or further divisions) such as N, NE, NW, etc., as described herein.

In this embodiment, RDI 100 can include an adhesive that allows it to be secured to the face shield portion of the firefighter's (or other user's) face mask. The adhesive can be any adhesive known in the art. Optionally, the adhesive can be an adhesive that allows the RDI 100 to be removably secured to the face mask of the SCBA to allow the battery in the RDI 100 to be changed or to replace the RDI 100 with a new one if the RDI 100 is damaged or no longer functions.

Many SCBA face masks, and protective face masks in general include a face shield that is oriented at an angle to the user's face. Thus, in one embodiment, a wedge member can be inserted between the face shield and the rear side 103 of the RDI 100 that causes the front side 102 of the RDI 100 to be substantially perpendicular to the user's line of sight when viewing the RDI 100. In an alternative embodiment, the rear side 103 of the RDI 100 can be wedge shaped as appropriate for the type of face mask used to provide a similar type of line-of-sight correction.

Figure 5:
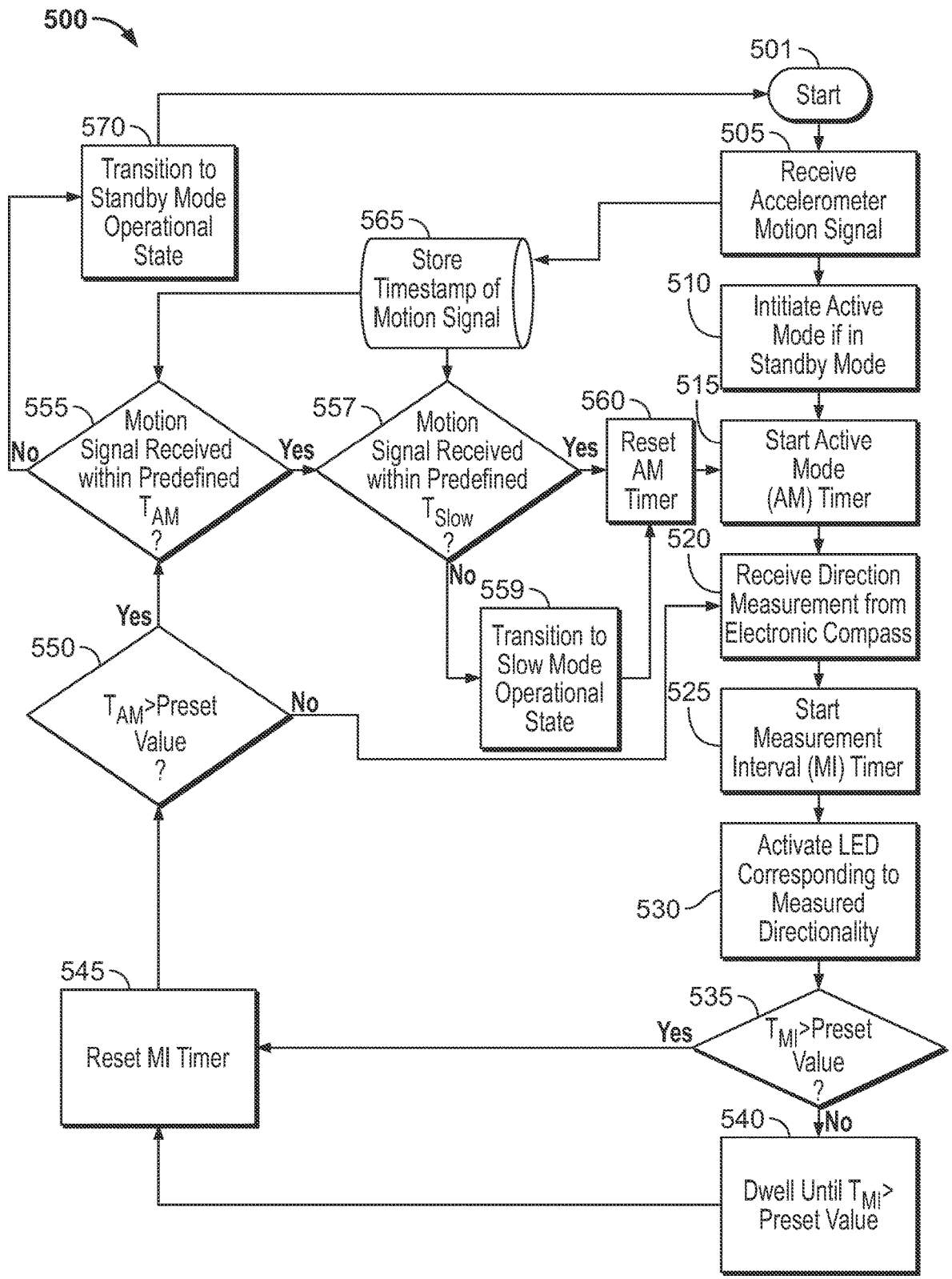
FIG. 5 is a flowchart illustrating an operational logic sequence of a relative directional indicator according to one embodiment.
Figure 6:
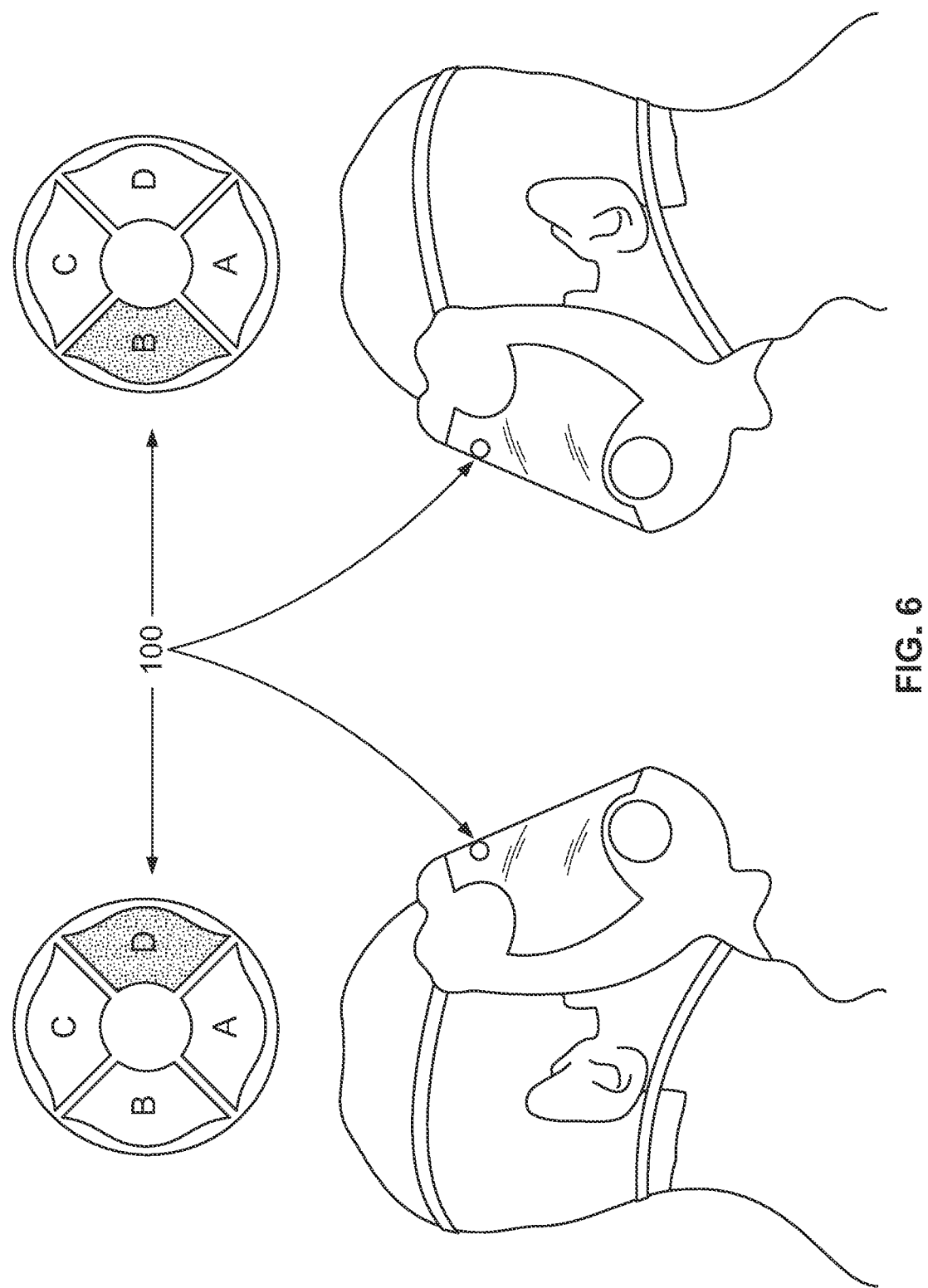
FIG. 6 illustrates the user's view of the relative directional indicator in opposing directions disposed within the SCBA face shield of FIG. 1.

Referring now to FIG. 5, a process 500 illustrating some operational characteristics of the RDI 100 is shown according to one embodiment. It will be understood that the process 500 illustrates one of many possible logic sequences for enabling the functionality of the RDI 100 as described herein, and therefore is not limited to the specific steps shown.

In this embodiment, the process 500 begins at the start bubble 501, which, for the sake of this illustration, can represent the RDI 100 in a low-power, standby mode, as if the RDI 100 has been at rest in a firefighter's locker for an extended period. Accelerometer 165 of the RDI 100 can remain active in the standby mode, being ready to sense movement and activate a wake-up signal accordingly.

In this example, at step 505 the microcontroller 160 receives an accelerometer 165 motion signal, which could occur, for example, when the firefighter picks up his or her SCBA face mask to go on a call. A timestamp of the motion signal can be stored in a data repository, e.g., cache memory, at step 565 for purposes of determining when to revert to standby mode later in the sequence as described below. Next, at step 510, if the RDI 100 was previously in standby mode, the microcontroller can transition to 'active' mode, which, as described herein, can be a full-power mode where the RDI functions to provide relative direction indication as described herein. Step 510, 'initiate active mode if in standby mode,' can be the initiation signal of step 905 in process 900. Accordingly, steps 910-950 of process 900 can be executed in-between steps 510 and 515 of process 500 as part of a RDI start-up initialization routine.

In this and other embodiments, accelerometer 165 or microprocessor 160 can be programmed to transition from a standby mode to active mode when a preselected sequence of motion signals is sensed or received, respectively, so as to discriminate against motion of the RDI 100 that is not intended to activate the device. For example, SCBA face masks are commonly carried on fire apparatus, and the motion of driving those apparatuses could cause the accelerometer to send a motion signal to the microcontroller. This could cause the RDI 100 to activate unnecessarily, which could cause rapid battery drain. To discriminate against such false signals, the RDI 100 can be caused to enter active mode after receiving, for example, two sharp taps to the SCBA face shield within a predefined period, e.g., 1 or 1.5 seconds. Similarly, the accelerometer 165 or the microprocessor can be programmed to only exit standby or slow mode, or both if a sharp motion, such as a tap, or a sequence of taps exceeds a pre-determined motion signal threshold level, which can be discriminated against lower-level background motion signals caused, e.g., from being in a driven apparatus. In this and other embodiments, the sequence of wake-up percussive taps can be different than the sequence of percussive taps used for changing the assignment of the relative directional indicator to the facing direction of the RDI as described herein.

In one embodiment, the microcontroller 160 can be programmed with an algorithm to discern a background level of motion, e.g., background noise, and remain in the standby mode until a motion event is sensed by the accelerometer 165 which is above the background level of motion, e.g., a tap or double-tap as described herein. In another approach, the microcontroller 160 can be programmed to detect a certain movement as evidenced by an accelerometer signal to cause the RDI 100 to enter a particular state, e.g., an active state, such as the movement associated with the RDI 100 being picked up, which can be compared against a measured average background level of motion, such as average motion associated with travel in an apparatus. In this and other embodiments, the circuit board can include other components necessary to enable the RDI 100 to differentiate between accelerometer events that should cause activation or 'wake-up' of the RDI 100 versus average 'background' motion sensed by the accelerometer 165, such as a memory module, e.g., RAM, ROM, cache or other types of memory, a repository of logic instructions, which may be stored, e.g., in RAM or ROM memory, and associated input and output registers necessary to effect electronic communication between the components.

Next, at step 515, after the RDI 100 has entered active mode, an active mode (AM) timer is started. The AM timer can be a timer that measures a preselected duration of time that the RDI 100 should remain in active mode, e.g., 30 minutes, 45 minutes, 1 hour, etc.

Next, at step 520, the microcontroller 160 receives a compass heading measurement from the electronic compass 170 and applies the relative heading correction factor as described herein to correlate the facing direction of the RDI 100 with at least one of the relative directional indicators 107a-d (step 955 of process 900). In this and other embodiments, the electronic compass 170 can be programmed to continually provide a compass heading value, e.g., a signal that indicates the direction that the electronic compass 170 and thereby the RDI 100 is facing, or, alternatively, the microcontroller 160 can query the electronic compass 170 for a compass heading at a desired frequency.

Next, at step 525, a measurement interval (MI) timer is started. The MI timer can be a timer that determines the 'refresh' frequency of the displayed relative directional indicator, the electronic compass 170, or both, such that the microcontroller 160 causes activation of, e.g., the appropriate one of the first (152), second (154), third (156) or fourth (158) LEDs at predetermined intervals, step 530. In one embodiment, a compass heading value can be determined by the microprocessor 160 by receiving x, y and z coordinate values provided by the electronic compass 170. The coordinate values can be mapped to a spherical coordinate system, from which the spherical coordinates $\rho$, $\theta$ and $\varphi$ can be determined by conventional mathematics. From these value, $\theta$ can represent the compass direction and $\rho$ can represent the tilt angle of the electronic compass 170. Alternatively, an electronic compass incorporating fusion sensor technology may be used which can obviate the need to calculate headings using a spherical coordinate system.

Next, at decision point 535, a determination is made as to whether the elapsed measurement interval time (TMI) is greater than the preselected (programmed) value. If not, the process continues to step 540, where the microcontroller dwells until TMI is equal to or greater than the preselected value. Next, at step 545, or if the determination of decision point 535 is affirmative, i.e., TMI is equal to, or greater than the preselected value, then the MI timer is reset.

Next, at decision point 550, a determination is made as to whether the elapsed AM time (TAM) is greater than or equal to the preselected (programmed) value. If so, e.g., if time remains for the RDI 100 to be in the active mode, then the process continues back to step 520 where the sub-sequence continues to loop until TAM is greater than, or equal to the preselected value. At that point, the process continues to decision point 555, where a determination is made as to whether a motion signal has been received during the preselected AM time. In this embodiment, the microcontroller 160 can access, for example, a timestamp of the last accelerometer motion signal; or determine the amount of time that has elapsed since the last accelerometer motion signal. This sub-sequence is useful to ensure that the RDI 100 does not switch to standby mode when it is actively being used. If TAM has elapsed and no accelerometer motion signals have been detected or stored within the preselected AM time, then the process proceeds to step 570, where the microcontroller initiates standby mode of the RDI 100. The process then returns to step 501, where the RDI 100 monitors for an activation signal from the accelerometer again, as discussed above.

Reverting to step 555, if a motion signal is received within the preselected AM period, then the process continues to step 557, where a determination is made as to whether or not the RDI 100 should continue in the active mode state, or the reduced-power slow mode state. In this embodiment, $T_{Slow}$ represents the preselected period for which if the accelerometer registers no motion, or the microcontroller determines that the motion is correlated with reduced user activity, then the RDI 100 transitions to the slow mode as described herein, step 559. Oppositely, if the accelerometer registers motion or the microcontroller determines that the motion is correlated with active user activity, e.g., active firefighting behaviors and activities, then the RDI 100 continues to function in awake mode and the AM timer is reset, step 560. The process then continues to step 515, previously described, and the sub-loop can continue until the state at decision point 555 is negative.

One advantage of the RDI 100 is that directional information is constantly being supplied to the user. In the case of firefighting, this can provide the ability to constantly monitor the firefighter's movements so that he or she can develop a mental map of their progress through a low- or zero-visibility environment. For example, if a firefighter has become disoriented within a structure, reference to the conventional A/B/C/D structure sides may supply at least some level of orientation. If that firefighter has monitored his direction using the RDI 100 as he progresses through the structure, he can realize, for example, that he has made an "L" shaped path to his current location, first traveling west, then north, for example. If the firefighter needs to quickly return along his ingress route, he will know that he needs to travel south and then east to escape.

As such, the RDI 100 not only aids a firefighter or other user in finding his or her exit from the building, but it can also assist in internal fire control operations. A firefighter inside a burning building often has low or no visibility, while outside, command staff personnel often see indicators—visible flames or smoke coming from an exterior wall, for example that allow them to better locate the source or current location of the fire. Incident commanders commonly use alphabetic identifiers to provide a reference system for building layout. However, this nomenclature is most successful to interior firefighting operations if the firefighter inside the building is oriented to the building itself. If the firefighter cannot determine which way he or she entered the building from, which is a common occurrence when the firefighter is in an unfamiliar environment, possibly with many twists and turns, or visibility is poor, then the incident commander may no longer be able to effectively direct internal fire control operations to the locations they are needed. Likewise, if the building must be evacuated and the firefighter cannot determine from which way he or she entered the building, that disorientation may result in the firefighter's injury or, potentially, death.

If a firefighter or other user has become disoriented, the RDI 100 can provide the relative direction and heading of the structure sides, for example, allowing the firefighter to re-orient themselves and, if the incident commander determines that the firefighter has become disoriented the incident commander can direct the firefighter to the proper location using the structure-side naming convention. For example, a firefighter may announce to their commander that they are lost or disoriented within the structure. In response, the commander may instruct the firefighter to find the nearest wall and face it head-on. Reading the RDI 100, the firefighter can then announce, for example, that they are facing the "C-side" wall. From this information (and referring to the layout and orientation of FIG. 8), the commander can instruct the firefighter to move to his right, until he meets the next wall (side "D"), then turn right to follow that wall to the "A" side wall, where, along that wall the entrance to the structure will be found.

It should be recognized by one skilled in the art that the size, configuration, or dimensions of the RDI 100 can be adjusted to fit various sizes of face masks of SCBAs, other types of facemasks, shields, hand-held devices and other similar articles.

Additionally, while the use of a RDI 100 with a self-contained breathing apparatus used by firefighters and similar personnel is discussed herein, it will be recognized by one skilled in the art that a RDI 100 can be used with any general type of self-contained breathing apparatus or protective face mask. For example, the present invention may also be used as part of the goggles or face mask used with a self-contained underwater breathing apparatus, a hazardous materials self-contained breathing apparatus, or other similar types of apparatus to indicate the direction the user of the apparatus is facing or moving. As such, the scope of the instant disclosure is intended to include all types and kinds of self-contained breathing apparatus and protective face masks, shields and hand-held devices in addition to those used for firefighting. A RDI 100 can also be used with helmets having a face shield, e.g., for motorcyclists, snowmobilers, and other activities.

A number of illustrative embodiments have been described. Nevertheless, it will be understood that various modifications may be made without departing from the spirit and scope of the instant disclosure and various embodiments presented herein. For example, various approaches can be used to indicate a low-battery status to the user, such as by flashing the at least one indicator repeatedly or, in the case of the RDI 100 illustrated in FIG. 2, for example, by flashing each of the "A", "B", "C" and "D" indicators in a circular pattern, or by flashing all of the indicators at once. A RDI of the type described herein can be used in professions other than firefighting. For example, police and SWAT teams commonly use face shields to protect themselves from harm, and such professionals also commonly chase suspects on foot. In such a circumstance, a DI can be used on the inside of an officer's face shield so that he or she can give updates to fellow officers or dispatch as to a relative direction of pursuit. While firefighting has generally been discussed herein from the aspect of structural firefighting, a RDI 100 can be used in forest firefighting activities, on ships and other types of water vessels, cave rescue and the like. Accordingly, other embodiments are within the scope of the claims.

What is claimed is:
1. A relative directional indicator assembly, comprising:
 a microprocessor in signal communication with an electronic compass that is configured to determine a compass heading corresponding to a direction that said relative directional indicator assembly is facing;

a housing comprising at least one relative directional indicator;

wherein said microprocessor is configured to:

receive said compass heading, and assign said calibration compass heading to the activation of a first one of said at least one relative directional indicators; and activate said first one of said at least one relative directional indicators when said relative directional indicator assembly faces said calibration compass heading.

2. The relative directional indicator assembly of claim 1, wherein said at least one relative directional indicator corresponds to a naming convention that is different than cardinal compass directions.

3. The relative directional indicator assembly of claim 2, wherein said housing comprises relative directional indicators "A", "B", "C" and "D", and wherein said calibration compass heading is assigned to activation of said directional indicator "A".

4. The relative directional indicator assembly of claim 2, wherein said housing comprises relative directional indicators "1", "2", "3" and "4".

5. The relative directional indicator assembly of claim 2, wherein said housing comprises the relative directional indicators:

"bow", "stern", "port" and "starboard"; or

"B", "St", "P" and "Sb"; or

"bow", "strn", "prt" and "stbd".

6. The relative directional indicator assembly of claim 2, wherein said microprocessor is further configured to assign a different compass direction to each of said at least one relative directional indicators that is relative to said calibration compass heading.

7. The relative directional indicator assembly of claim 6, wherein said microprocessor is configured such that when said relative directional indicator assembly faces a compass direction assigned to one of said relative directional indicators, the relative directional indicator matching the compass direction is activated by being illuminated, highlighted or displayed.

8. The relative directional indicator assembly of claim 1, wherein said at least one relative directional indicator is a geometric shape exclusive of letters or numbers.

9. The relative directional indicator assembly of claim 8, wherein said geometric shape comprises two curved lines originating from a common apex, said apex representing a bow of a ship.

10. The relative directional indicator assembly of claim 8, wherein said geometric shape is an outline of a ship having a bow portion, a stern portion, a port-side portion and a starboard-side portion, and wherein each of said portions is individually illuminable.

11. The relative directional indicator assembly of claim 1, further comprising a remote activator in wireless signal communication with a receiver, wherein said receiver is in signal communication with said microprocessor, and wherein said remote activator is configured to transmit signals to control powering said relative directional indicator assembly on or off.

12. The relative directional assembly of claim 1, further comprising a remote activator in wireless signal communication with a receiver, wherein said receiver is in signal communication with said microprocessor, and wherein said remote activator is configured to transmit a signal that causes said microprocessor to determine said calibration compass heading corresponding to said direction that said relative directional indicator assembly is facing.

13. A method for displaying a relative direction in a relative direction indicator assembly, comprising:

receiving a first compass heading from an electronic compass;

assigning said first compass heading to a first relative direction indicator that itself is a component of a defined naming construct exclusive of cardinal directions, intercardinal directions, divisions thereof or compass degrees;

calculating an anti-heading of said first compass heading;

assigning said anti-heading to a second relative direction indicator that defines an opposite relative direction to said first relative direction; and activating, illuminating or projecting said first or said second relative direction indicator when a compass heading is received by said electronic compass that matches said first compass heading or said anti-heading, respectively.

14. The method of claim 13, wherein said naming construct correlates with a chosen structural feature of an object.

15. The method of claim 14, wherein said chosen structural feature is used as a point of orientation or reference in locating or visualizing adjacent or connected structural features of said object.

16. The method of claim 14, wherein said naming construct comprises assigning a chosen side of a building the "A" side, and wherein said second relative direction indicator is the letter "A".

17. The method of claim 13, wherein said causing the relative directional indicator associated with the direction that the relative direction indicator is facing to be activated, illuminated or displayed comprises:

activating an LED proximal to a window that is shaped as said relative directional indicator;

projecting said relative directional indicator into a surface; or displaying said relative directional indicator on an electronic display screen.

18. A method for determining interior orientation relative to a defined naming construct of the boundaries an object having exterior walls, comprising:

receiving a first compass heading corresponding to a first direction facing a selected exterior wall of said object from an electronic compass;

determining a second compass heading that is opposite of said first direction;

assigning said second compass heading to a first one of a plurality of relative directional indicators corresponding to said defined naming construct of said selected exterior wall.

19. The method of claim 18, further comprising monitoring a heading output of said electronic compass, and when said heading output matches said second compass heading, causing said first relative directional indicator to be activated, illuminated, projected or displayed on a display screen.

20. The method of claim 19, further comprising receiving an initiation signal from a wireless remote module that causes said first compass heading to be determined.

* * * * *